(12) United States Patent
Crawford et al.

(10) Patent No.: US 7,256,371 B2
(45) Date of Patent: Aug. 14, 2007

(54) TEMPERATURE CONTROL METHOD FOR POSITIVE TEMPERATURE COEFFICIENT TYPE HEATING ELEMENT

(75) Inventors: John Crawford, South Australia (AU); Mark Potter, South Australia (AU); Kevin Altschwager, South Australia (AU)

(73) Assignee: Integrated Electronic Solutions Pty Ltd. (AU)

( * ) Notice: Subject to any disclaimer, the term of this patent is extended or adjusted under 35 U.S.C. 154(b) by 0 days.

(21) Appl. No.: 11/083,448

(22) Filed: Mar. 18, 2005

(65) Prior Publication Data

US 2005/0205549 A1    Sep. 22, 2005

(30) Foreign Application Priority Data

Mar. 22, 2004 (AU) .............................. 2004901471

(51) Int. Cl.
*H05B 1/02* (2006.01)
(52) U.S. Cl. ................. 219/494; 219/482; 219/494; 219/501; 219/504; 219/505; 219/219; 219/497
(58) Field of Classification Search ................ 219/482, 219/494, 501, 504, 507, 505
See application file for complete search history.

(56) References Cited

U.S. PATENT DOCUMENTS

| | | | | |
|---|---|---|---|---|
| 3,789,190 A * | 1/1974 | Orosy et al. ................. | 219/497 |
| 4,013,872 A * | 3/1977 | Glass ........................ | 219/497 |
| 4,086,466 A * | 4/1978 | Scharlack .................... | 219/494 |
| 4,130,853 A * | 12/1978 | Baker ......................... | 361/264 |
| 4,329,568 A * | 5/1982 | Rocher et al. .............. | 219/497 |
| 4,641,778 A * | 2/1987 | Dodson ...................... | 236/20 R |
| 4,736,090 A * | 4/1988 | De Broeck et al. ......... | 219/497 |
| 4,736,091 A * | 4/1988 | Moe ............................ | 219/505 |
| 4,788,417 A * | 11/1988 | Graflind ..................... | 219/528 |
| 4,858,576 A * | 8/1989 | Jeffries et al. .......... | 123/145 A |
| 5,128,516 A * | 7/1992 | Plasko et al. ............... | 219/497 |
| 5,323,062 A | 6/1994 | Crawford et al. | |
| 5,430,427 A * | 7/1995 | Newman et al. .......... | 338/22 R |
| 5,521,850 A * | 5/1996 | Moe et al. .................. | 700/299 |
| 5,528,017 A * | 6/1996 | Wolff ......................... | 219/501 |
| 5,734,289 A | 3/1998 | Khudoshin | |
| 5,847,367 A | 12/1998 | Hancock et al. | |
| 6,064,801 A * | 5/2000 | Stokes et al. ............... | 392/501 |
| 6,342,997 B1 * | 1/2002 | Khadkikar et al. ......... | 361/103 |
| 6,633,726 B2 * | 10/2003 | Bradenbaugh .............. | 392/463 |
| 2001/0009609 A1 * | 7/2001 | Bradenbaugh .............. | 392/463 |

FOREIGN PATENT DOCUMENTS

EP     745919 A1 * 12/1996
WO    WO 99/33326    * 7/1999

* cited by examiner

*Primary Examiner*—Tu Ba Hoang
*Assistant Examiner*—Stephen J. Ralis
(74) *Attorney, Agent, or Firm*—Akerman Senterfitt

(57) ABSTRACT

A controller adapted to control the temperature of a heating elements with a wide range of positive temperature coefficient of resistance, including very low values, using a sensor in line with the heating element. The controller is able to take account of non-constant mains power supplies and variation in the element resistance over time.

19 Claims, 5 Drawing Sheets

TEMPERATURE CONTROL METHOD FOR POSITIVE TEMPERATURE COEFFICIENT TYPE HEATING ELEMENT

TECHNICAL FIELD

The present invention relates to a circuit arrangement for controlling the temperature of a heating element supplied from an AC mains supply, particularly being of a type where the resistance of the element is used as a measure of its temperature.

BACKGROUND ART

It is known to use time proportional control for on/off triac circuit arrangements for controlling the temperature of heating elements in hotplates, frypans, irons and the like. In these circuit arrangements the temperature of the element is sensed by a separate negative temperature coefficient (NTC) or separate positive temperature coefficient (PTC) thermistor thermally coupled to the object to be controlled. Effective thermal coupling between the sensor and the heating element is difficult to achieve in high temperature applications and improper thermal coupling results in large temperature errors. Alternative methods of sensing the temperature of the element rely on using the temperature coefficient of resistance (TCR) of the element itself.

U.S. Pat. No. 5,847,367 discloses as a mere paper publication a circuit for controlling heating elements that exhibit a high "positive temperature coefficient" of resistance (PTC) i.e. its ohmic resistance value increases with increasing temperature.

For example it is known that pure metals exhibit a positive temperature coefficient, whereas alloy resistance elements generally seek to have no temperature coefficient. In the circuit arrangement discussed in the above patent, a separate current sensing means connected in series with the element is used to measure the current through the element. The current flowing through the element is determined by its resistance, which in turn is a function of its temperature. Thus there is no need for a separate thermocouple sensor. The circuit is supplied by an alternating current mains supply coupled to the element via a switching means. In this circuit when the temperature of the heating element becomes too hot, the alternating current flowing through the element is switched off. When this occurs it is not possible to subsequently measure the temperature of the heating element.

In order to subsequently measure the temperature of the heating element the circuit has a timer which periodically switches on the element for a period determined by the controller. The circuit uses a comparator to compare the voltage provided by the sensing means with the voltage on a variable resistor to determine whether the temperature of the element is above or below the temperature set by the user. As the voltage supplied by the current sensing means is applied directly to the comparator the circuit requires large changes in the resistance value of the element with temperature in order to closely determine the variation of the temperature of the element from the desired temperature.

Investigations have shown that this circuit has a number of limitations. In certain applications where the PTC characteristic of the basic element material is very low, the circuit does not have sufficient discrimination to accurately control the temperature of the element. Also in such applications, because of the low PTC characteristic a small error in absolute resistance is equivalent to a large temperature error. This circuit has no means to compensate for tolerances in absolute resistance value of the element.

In all cases fluctuations in mains supply voltage will vary the current through the element, and also through the sensing means. The circuit reacts to changes in the current detected flowing through the sensing means by increasing or decreasing the temperature of the heating element to compensate. Therefore the accuracy of the regulation of the temperature of the heating element is dependent on mains supply voltage.

DISCLOSURE OF THE INVENTION

An object of the invention is to provide an alternative circuit arrangement which minimises these disadvantages of known circuits for controlling the temperature of heating elements, the resistance of which heating element is a function of temperature or at least to provide the public with a useful alternative.

In one form, the invention may be said to reside in a circuit arrangement for controlling the temperature of a heating element within a selected temperature range, the resistance of which heating element is a function of temperature and which has a low temperature coefficient of resistance (TCR), the circuit having among other functional units at least the following namely;

a switch adapted to conduct an alternating current to the heating element when a switch controller is in an ON state, and to not conduct when the switch controller is in an OFF state, a current sensor coupled to the heating element adapted to provide as an output a voltage, the magnitude of which voltage is dependent on the magnitude of current passing through the heating element, a zero set point controller adapted to supply a first voltage proportional to the alternating mains supply voltage, a difference sensor with a first input connected to the current sensor, and a second input connected to the zero set point controller adapted to produce an output signal which is dependent on the difference between voltage signals received at the first and second inputs, an operational set point controller adapted to supply a second voltage proportional to the alternating mains supply voltage, the value of the second voltage being dependent on a selected desired temperature of operation of the heating element, a timer adapted to supply timing pulses of a selected pulse duration and period, a threshold detector electrically connected to receive the output signal of the difference sensor and the output signal of the operational set point controller and adapted to provide a selected output when an extent of magnitude of difference between the said signals is greater than a selected extent, logic circuitry adapted to set the switch controller to an ON state in response to a said timing pulse, and to reset the switch controller to an OFF state in response to a selected output from the threshold detector.

In preference the difference sensor is adapted such that an output signal of the difference amplifier is minimal at the lowest extreme of the temperature control range, the output signal of the difference sensor being an alternating voltage having a magnitude proportional to the change in output voltage of the current sensor due to change in element resistance.

In preference the zero set point controller is further adapted to allow the value of said first voltage to be set by a user to be equivalent to an output voltage of the current sensor at a lowest temperature of the selected temperature range.

In preference the difference sensor is a differential amplifier.

In preference the first input of the differential amplifier is an inverting input and the second input is a non-inverting input.

In preference, the operational set point controller is further adapted to be adjusted by a user to select a desired temperature of the heating element.

In preference, the switch is a triac.

In preference, in the alternative, the switch is a relay.

In preference the threshold detector is adapted to function as an integrator thus providing a high degree of immunity to transients and radio frequency interference that may be present on the inputs.

In another form of the invention, the invention may be said to reside in a circuit arrangement for controlling the temperature of a heating element, the resistance of which heating element is a function of its temperature, the circuit comprising:

a switch adapted to control the flow of an alternating current to the heating element when a switch controller is in an ON state, and to not conduct when the switch controller is in an OFF state, a current sensor coupled to the heating element adapted to provide as an output a voltage, the magnitude of which voltage is dependent on the magnitude of current passing through the heating element, a zero set point controller adapted to supply a first voltage proportional to the alternating mains supply voltage, a difference sensor with a first input connected to the current sensor, and a second input connected to the zero set point controller adapted to produce an output signal which is dependent on the difference between voltage signals received at the first and second inputs, an operational set point controller adapted to supply a second voltage proportional to the alternating mains supply voltage, the value of the second voltage being dependent on a selected desired temperature of operation of the heating element, further including a microcontroller including software to provide a timing function generating timing pulses having a predetermined pulse duration and period, said pulses causing the switch controller to turn the switch ON at predetermined intervals, the microcontroller being further adapted to receive the output signal of the difference sensor and the output signal of the operational set point controller and to provide a selected output when an extent of magnitude of difference between the said signals is greater than a selected extent, logic circuitry adapted to set the switch controller to an ON state in response to a said timing pulse, and to reset the switch controller to an OFF state in response to a selected output from the threshold detector.

In preference, the inputs to the microcontroller include means to prevent or reduce interference or transients causing voltage measurement errors by the microcontroller.

In preference, the microcontroller and software are adapted to provide a self calibration function of the controller by periodically measuring and recording the magnitude of the output of the difference sensor at times when the element is at room temperature.

In preference the software timing circuit is adapted to vary the period of the timing pulse, such that at low control temperatures, the period is increased, such that the duty cycle is decreased without decreasing the minimum ON time, providing more accurate temperature control at low temperature settings.

In preference, the microcontroller is adapted to calibrate the room temperature value of the heating element resistance by using internal timing or stored timing means to ensure that the element has been turned OFF for an extended or known period of time.

In preference, the microcontroller is adapted to calibrate the room temperature value of the heating element resistance by turning the heating element ON for one half or one full mains cycle only, such that the voltage across the sensing means can be quickly measured before the element has increased in temperature above its "cold" value.

In preference, the microcontroller software algorithm is adapted to continuously monitor ON state temperature, and integrate the temperature over the operating time of the element, and include the appropriate correction to resultant output of the difference amplifier (representing the element temperature) in order to maintain the element temperature at the desired set-point, and compensate for any drift in the "resistance versus temperature" characteristic of the heating element. This allows for the variation in resistance over time of a heating element.

An advantage of this invention is that it can be used with heating elements exhibiting either a very low temperature coefficient of resistance, or a high temperature coefficient of resistance. Applications employing elements having low temperature coefficient of resistance include some thin-film or thick-film element materials such as tin-oxide (SnO), silver or rare-earthed based elements. These types of elements are seen in stoves, cook-tops, kettles, heaters, etc. Amplifying the difference signals derived from the current sensing means and the first scaling means before applying these signals to the detector provides greater accuracy of temperature control not possible in previous circuits. The circuit can be used for almost any value of temperature coefficient of resistance without major modifications to the circuit arrangement.

A further advantage of this invention is that since both the first and second scaling means are supplied from the mains supply, the resultant temperature control characteristic of the circuit is unaffected by fluctuations in mains supply voltage.

BRIEF DESCRIPTION OF THE DRAWINGS

Accordingly the embodiment is being described with the assistance of drawings wherein.

BEST MODE FOR CARRYING OUT THE INVENTION

Figure 1:
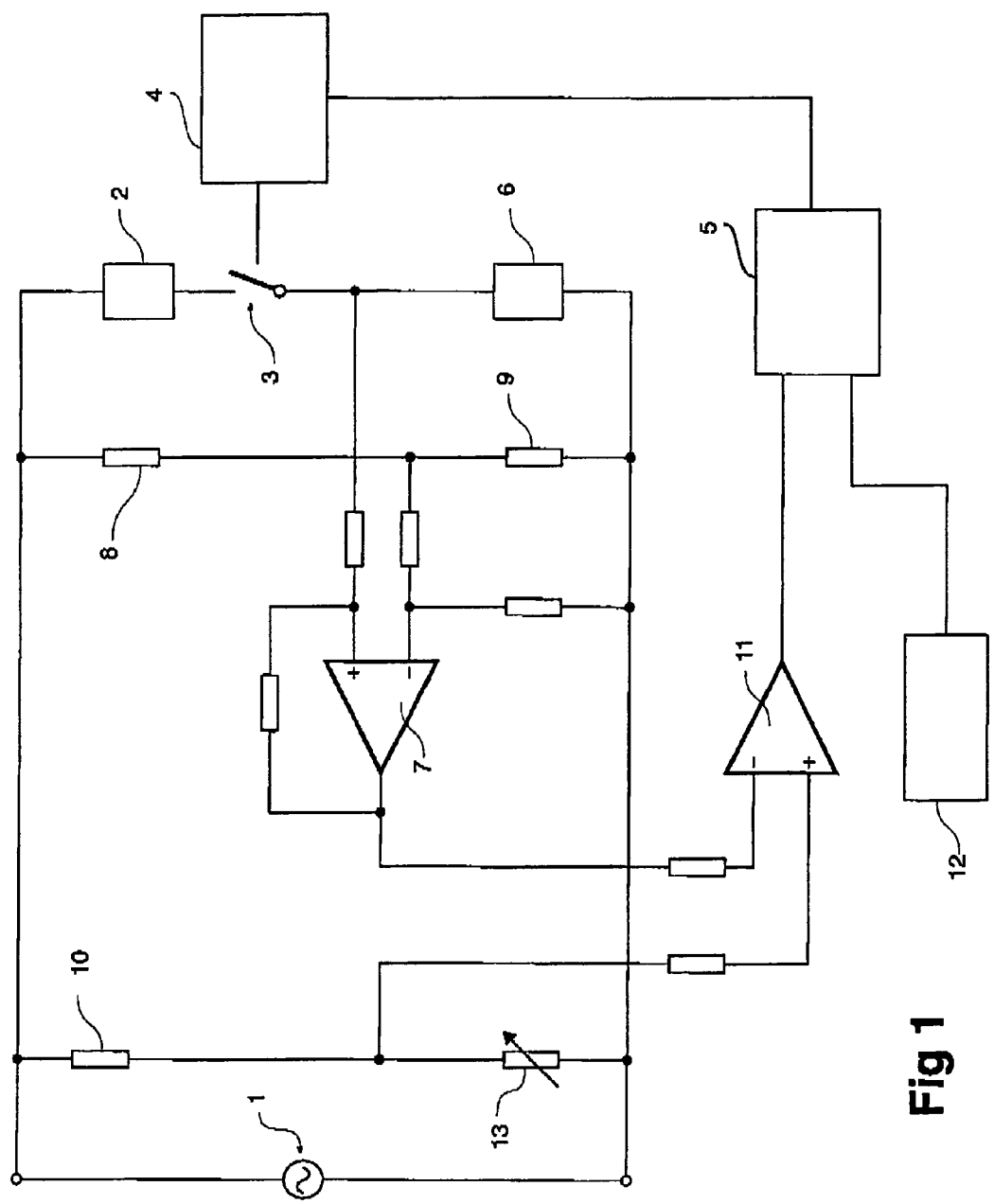
FIG. 1 is a simplified circuit diagram of the invention.

Referring to the drawings in detail, FIG. 1 shows a simplified circuit diagram of the invention. A mains voltage supply 1 energises a heating element 2 when a switch 3 is closed. The heating element has a non-zero temperature co-efficient of resistance. The switch is operated by switch controller 4, in response to signals from logic circuitry 5.

Current sensor 6 provides a signal to difference amplifier 7, which acts as a difference sensor. Resistors 8 and 9 form a zero set point controller. The resistors are selected so that the output of the difference amplifier is essentially zero when the heating element temperature is at its minimum operational value. This voltage divider formed by resistors 8 and 9 provides another input to the difference amplifier 7. Thus the output of the difference amplifier is an alternating voltage, whose magnitude is proportional to the change in output voltage of the current sensor due to changes in the resistance of the heating element.

Potentiometer 13 and resistor 10 form a manual set point controller. These two components form a voltage divider whose output is a proportion of the mains voltage which may be varied by adjusting the potentiometer 13. A user adjusts the potentiometer in order to set the temperature at which the heating element should operate.

The output of the operational set point controller and the output of the difference amplifier are fed to an amplifier 11 acting as a threshold detector, which will supply a logic signal when the difference between the two input signals indicates that the temperature of the heating element exceeds the required temperature set by the user.

A timer circuit 12 provides a periodic logic signal to the logic circuitry.

The logic circuitry signals the switch controller to turn on in response to a signal from the timer and off in response to a signal from the threshold detector. Thus the heating element is turned on periodically, heats to the require temperature and then is turned off.

Figure 2:
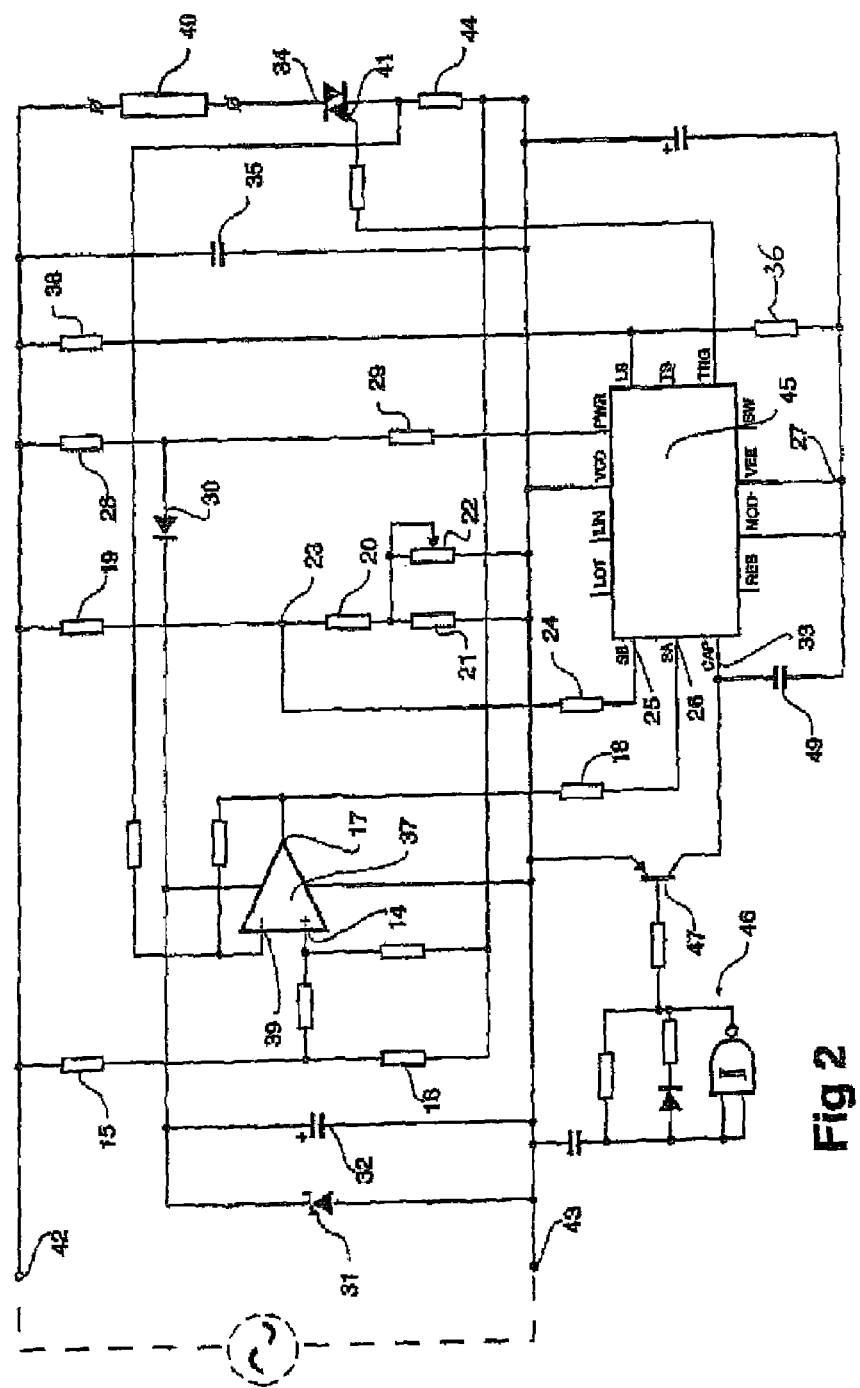
FIG. 2 is a circuit diagram of an embodiment of the invention.

FIG. 2 is a circuit diagram of an embodiment of the invention. This embodiment includes a triac control IC 45 being in this case the OM1682 integrated circuit. This integrated circuit is described in U.S. Pat. No. 5,323,062.

This circuit operates as follows. Mains voltage is applied to supply terminals "A" (active) 42 and "N" (neutral) 43. A triac 34 is used a switch to control the supply of power to a heating element 40, the input gate 41 of the triac being driven by the triac drive and synchronisation circuit of the triac control IC 45. When power is applied to the circuit, the triac is initially OFF.

There is a timer 46, which may conveniently be implemented as an integrated circuit referred to as HEF4093, which is configured to provide a short timing pulse at regular intervals, in this case approximately every five seconds. The timing pulse is applied to transistor 47, which when turned ON charges pre-charge capacitor 49 up to the positive (common) rail voltage, to provide a logic high on die capacitor pin 33 of the triac control IC, setting an internal latching circuit which enables the triac drive and synchronisation circuit of the lilac control IC, turning the triac ON.

Once the triac is turned ON, an AC current is able to flow through the element 40 and the current sense resistor 44, which acts as a current sensor. This current develops an AC voltage across the current sense resistor in proportion to the magnitude of the load current, which will vary with element temperature due to its temperature coefficient of resistance.

The voltage (referred to as Va) across the current sense resistor is applied to the inverting input 39 of amplifier 37, which is configured as difference amplifier. The non-inverting input 14 is presented with a voltage (referred to as Vb) derived from the voltage divider circuit comprising resistor R1 15 and resistor R2 16. The values of the resistors R1 and R2 of the divider are chosen to provide a voltage equivalent to the voltage across the current sense resistor when the element is at room temperature which may be conventionally taken to be 25° C. The gain of the amplifier 37 is set to 180, therefore the voltage at the amplifier output 17, referred to as Vx, is 180 times the voltage difference of the two inputs (ie. 180 times Va−Vb).

When the temperature of the element is 25° C., Va=Vb, and the voltage at the amplifier output 17 is 0V. However, as the temperature of the element 40 increases due to the power dissipation in the element, the current through the element decreases. This is because the element has a positive coefficient of temperature and the resistance of the element rises as the temperature of the element rises.

This reduction in current causes the voltage across the current sense resistor 44 to decrease, making Vb<Va, and providing a non zero value for Vx. The output voltage of the difference amplifier Vx therefore increases with increased element temperature.

Because the DC supply voltage for the difference amplifier is positive with respect to common, its output voltage can only be positive with respect to common. Therefore although both input signals Va and Vb are AC signals centred about common, negative excursions of output voltage Vx are clipped by the difference amplifier, so Vx is effectively a "half-wave-rectified" sine-wave signal. The negative half of Vx is simply ignored.

The positive "half-wave" voltage waveform Vx is convened to a current by resistor R4 18, and injected into the SA input 26 of the triac control IC 47.

An operational set point controller is formed by R3 19, R7 20, R6 21 and the potentiometer 22 form a voltage divider, providing a voltage Vy at 23 which is user adjustable by varying the wiper position of the potentiometer 22. The resultant voltage Vy is an AC voltage signal, which is converted into a current by resistor R5 24 and injected into the threshold detector input SB 25 of the triac control IC 47.

The principle of the OM1682 triac control IC 47 detector circuit is described in U.S Pat. No. 5,323,062. In short the detector works in such a way that the difference between the input currents at input SA 26 (called $I_{SA}$) and the input current at input SB 25 (called $I_{SB}$) (ie. $I_{SB}$-$I_{SA}$) is integrated by capacitor C2 49. When the current into input SB is greater than the current into input SA, capacitor C2 is charged up to an ON threshold, at which point the triac drive and synchronisation circuit is enabled, to turn the triac 34 ON. Conversely when the current into input SA is greater than the current into input SB, capacitor C2 is discharged to an OFF threshold, at which point the triac drive and synchronisation circuit is disabled, and the triac is turned OFF.

Only positive currents into inputs SA or SB are used. Negative currents are ignored, and bypassed by internal diodes. Therefore only positive excursions of Vx and Vy contribute to input currents $I_{SA}$ and $I_{SB}$ respectively. This detector circuit as used in the integrated circuit OM1682 is useful for this application, as it provides extremely high immunity to transients and interference.

Once the triac turn "ON" has been initiated by the timing circuit IC2 46, the detector of the triac control IC 45 monitors whether the voltage Vy (set by the user through the potentiometer 22) is greater than or less than the voltage Vx (determined by element temperature). When the clement temperature is less than the desired temperature, Vx<Vy, then $I_{SA}$<$I_{SB}$, so capacitor C2 49 is charged high, enabling the triac drive and keeping the triac ON. While the triac is ON, power is being dissipated in the element, raising its temperature, increasing its resistance, and therefore reducing the current through the element 40 and the current sense resistor 44. The reduced current provides a reduced voltage Vb, which increase the difference between Va and Vb (it Va-Vb increases) at the input of the difference amplifier 37, increasing its output voltage Vx until eventually Vx>Vy.

Once Vx>Vy, input current $I_{SA}$ is greater than $I_{SB}$, discharging capacitor C49 to the OFF threshold, disabling the triac drive and turning the triac OFF. So once the element has reached the set temperature, the triac is turned OFF.

Once the triac is turned OFF, no current flows through the element or sense resistor, thus the voltage on the sense resistor (Vb) drops to 0V.

With this circuit configuration, a low voltage at Vb is equivalent to a very high element temperature (since Vb reduces as the load current reduces with increased element resistance at higher temperature). So with Vb=0V, then the output Vx of the difference amplifier will be a high voltage, and in practice will be clipped to the positive rail voltage. Vx will continue to remain high while the triac is OFF, ensuring tat Vx>Vy, so $I_{SA}$>$I_{SB}$ the internal latching circuit of IC1 will continue to maintain the nine in the OFF state. It will remain OFF until a further timing pulse is provide by the timing circuit IC46, turning the triac ON and starting the cycle again.

Note that the OM1682 integrated circuit used in this embodiment generates its own negative supply rail (Vee) 27. Being on the negative side of the common rail, the OM1682 integrated circuit is able to supply negative gate pulses to the triac, to avoid using insensitive quadrants and minimize gate current (and hence power supply) requirements. Resistors R11 28 and R10 29 provide the power supply to the triac control IC directly from the AC mains. Resistors R8 36 and R9 38 provide mains synchronisation for the OM1682 integrated circuit, such that gate pulses to the triac 34 occur at the voltage zero-crossing of the AC mains voltage. Diodes D2 30, D3 31. and capacitor C4 32 provide the positive DC supply for the difference amplifier.

C5 35 is an X1 rated mains capacitor to provide EMC filtering of the AC mains supply.

Figure 3:
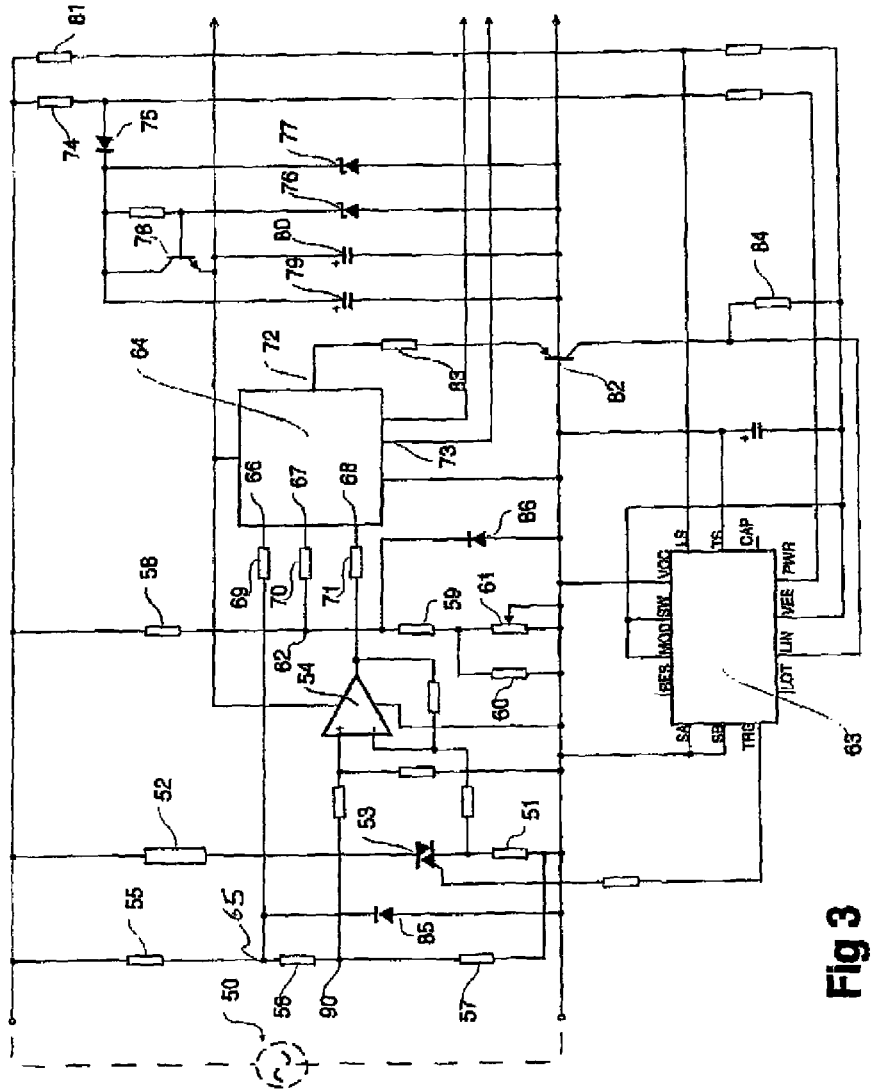
FIG. 3 is a circuit diagram of an alternative embodiment including a microcontroller.

A further enhancement of the circuit is shown in FIG. 3. The embodiment shown in this circuit includes self-calibrabon of the "room temperature" resistance of the heating element, to compensate for tolerances in absolute value of element resistance, tolerance of the sensing resistor, and also to provide a correction for long-term drift and aging affects which may change the element's resistance value over time.

Further, there is compensation for mains voltage variation, so that element temperature remains unaffected by fluctuations in the AC mains supply.

It is possible to adapt the period of the internal timing control circuit, and so increase the timing period at low control temperature settings, to provide increased accuracy improved control.

The embodiment provides for "push-button" control of the desired set temperature, as an alternative for the continuously variable control potentiometer.

There is a capability to provide digital output, which can be sent to a suitable display driver, to give a visual display of element temperature.

This circuit has a number of similarities to the previous circuit of FIG. 2. The circuit is supplied from the AC mains supply 50 with a sensing resistor 51 being used in series with the heating element 52 and the triac switch 53, to provide a voltage which is proportional to the load current.

The AC voltage (Vs) across the sense resistor 51 is applied to the inverting input of a difference amplifier 54.

A bias voltage (Vb) at 90 is derived from a voltage divider network comprising resistors 55, 56 and 57, to provide a reference voltage, which is equivalent to the sensed voltage (Vs) across the sense resistor 51 when the heating element 52 is at minimum temperature, which by conventional definition is taken to be 25C. This reference voltage is applied to the non-inverting input of the difference amplifier 54.

A voltage divider is included comprising resistors 58, 59 and 60 and a variable resistor 61, which is used to provide a user adjustable control voltage (Vc) at 62 to set the desired operating temperature of the element.

There is a triac control IC 63 (OM1682) which comprises power supply, triac drive and synchronisation circuitry to control the switching of triac 53. The IC 63 provides negative gate pulses to the triac 53.

A timing control is generated internally by a microcontroller 64 using software timing routines. A further tap on the mains voltage divider made up of resistors 55,56 and 57 provides an additional reference voltage Vr at 65, which is used to monitor the mains voltage, to be able to provide any necessary temperature compensation against mains voltage variations.

A microcontroller 64 is included which provides the following functions:

It has three separate and independent analogue to digital (A to D) converter inputs, 66, 67 and 68. Input 67 is connected via resistor 70 to to user-adjustable voltage divider to set control temperature (Vc) at 62.

Input 68 is connected via resistor 71 to the output voltage (Vt) from the difference amplifier 54 which is presentative of the beating element temperature.

Input 66 is connected via resistor 69 to the mains reference voltage input (Vr) at 65.

A software algorithm internal to the microcontroller uses these three analogue inputs to control the temperature of the heating element.

(Vt represents temperature, Vc desired control point, Vr mains reference)

Calibration of the "cold" resistance of the element 52 is undertaken by turning the element ON for one half or one full cycle only, to measure the value of voltage Vt derived from the sense resistor 51 when the element is at room temperature. For elements having very low thermal inertia (eg. "thin film type elements") the measurement must be completed as quickly as possible, before the element has had a chance to heat up.

The microcontroller 64 produces an output signal voltage at output 72 which is conveyed to the triac control IC 63, as required to turn the triac 53 ON and OFF to control the heating element.

The microcontroller 64 also provides a serial communications interface for communicating temperature information to a display driver or recording means, for displaying or recoding set temperature and/or actual element temperature.

A power supply consisting of resistor 74, diode 75, Zener diodes 76, 77, transistor 78, and capacitors 79, 80 provide a regulated 5V DC voltage supply for the microcontroller 64, with resistors 74, 81 also providing power to the triac driver device 63 which internally generates its own negative 6.5V DC voltage supply.

Transistor 82, and resistors 83, 84 are used as a level shifting network, such that a single bit digital output signal from the microcontroller can be applied to the triac driver IC 63.

Diodes 85, 86 are provided to clamp any negative going signal voltages at Vr and Vc respectively to protect the "A to D" inputs 66, 61, 68 of the mircocontroller 64.

In an alternative embodiment (not shown), the triac drive and synchronisation function provided by the triac driver 63 is provided by the microcontroller under software control, with the power supply being provided by additional external components.

Figure 4:
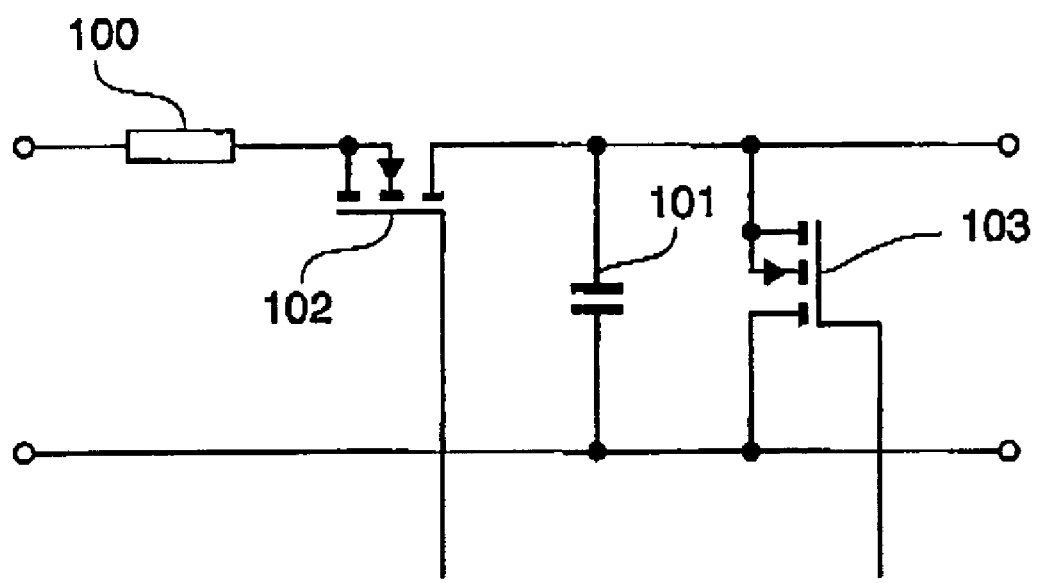
FIG. 4 is a circuit diagram of a filter used in conjunction with the embodiment of FIG. 3.

In a further embodiment a switching filter as shown in FIG. 4 is included in the circuit, connected to each of the A to D inputs 66, 67, 68. The switching filter (sample and hold) network helps to avoid false measurements being recorded via the "A to D" inputs 66, 67, 68 of the microcontroller 64 due to transients being present at the instant a measurement is taken. The circuit comprises a resistor 100, capacitor 101, and two FET type transistors 102 and 103. The FETs 102, 103 are used as analogue switches, controlling the charge and discharge of the capacitor 101. They are switched in synchronism with the mains supply voltage, such that for positive mains half cycles, FET 102 is turned ON allowing the capacitor to be charged via resistor 100 while the input voltage is positive. By turning the FET 102 on for the duration of the positive mains half cycle, the network is able to integrate the input voltage over the complete half wave. This leaves a DC voltage level on the capacitor 101, which can be sampled by the microcontroller "A to D" inputs at any time during the negative mains half cycle, providing a 10 mS window for taking the "A to D" sample. Once the microcontroller has sampled the analogue DC voltage on capacitor 101, FET 103 is turned on to discharge capacitor 101. The voltage on capacitor 101 is now back to the starting condition (i.e. 0V), ready for the next positive going mains half cycle, when FET 102 will again be turned on to start the cycle again.

All three analogue signals being monitored by the microcontroller (ie. Vr, Vc and Vt) are positive with respect to the negative (common) voltage rail of the microcontroller, since negatively going half cycles are clamped by diodes 85, 86. Therefore all the voltages of interest will be of a "half-wave rectified" nature, the negative or unwanted half cycles are simply ignored. The voltage dividers associated with Vr, Vc and Vt are so chosen such that the analogue signals they provide remain within the dynamic range of the microcontroller A/D inputs over the full temperature control range of the element.

By using the filter network of FIG. 4 to integrate the input voltages over the duration of the positive going mains half cycle, any noise or interference on the mains is averaged, and any transients or noise spikes are never applied directly to the A/D inputs where they may otherwise cause false triggering (false sampling).

As an additional safeguard against false triggering, the digital samples of the analogue voltage on the capacitor can be processed in software, to digitally average the value of the capacitor charge voltage over several half cycles, such that any one sample is not able to cause false triggering.

The microcontroller of FIG. 3 is able to "self-calibrate" the controller/element heating system. To achieve this, the microcontroller 64 must determine the "cold" or room temperature value of the element 52 resistance by turning on the triac switch 53 for one mains half cycle only, to measure and record the value of the analogue voltage output Vt of the difference amplifier 54. Having stored this "room temperature" value of the derived sense voltage Vt (as representing the room temperature value of element resistance), any subsequent measurement of Vt can be compared with this room temperature value. The internal software algorithm calculates the actual temperature from the change in Vt with time as power is applied to the heating element, taking into account any variation in mains supply voltage as measured from the reference voltage input Vr.

The bias resistor network of resistors 55, 56, 57 in the reference arm of the bridge circuit has been so chosen such that the voltage across resistor 57 (Vb) is equal to the sensed voltage (Vs) across the element when the heating element is at room temperature. If Vb exactly matches Vs when the temperature of the element is 25° C., then the voltage output Vt of the difference amplifier will be 0V, and this will be the reference analogue voltage stored by the microcontroller as representing the "cold" resistance value of the element.

The manufacturing tolerance of the absolute resistance value of a heating element may be anything up to ±5% for film type elements, or even ±10% for iron cored PTC elements. Because of the (potentially) very low PTC characteristic of thin-film type elements, this tolerance in room temperature resistance value can represent a very high tolerance in measured temperature. Therefore the bias network including resistor 57 must be chosen such that the voltage Vb is higher in value than that created across sense resistor 51 for the lowest possible element resistance in the manufacturing tolerance range. If this is satisfied, then as the element resistance increases with increasing temperature, so the current through the element decreases, decreasing the voltage across sense resistor 51.

This will ensure that the voltage Vs created across resistor 51 is always less than the bias voltage Vb in every case, and ensuring that the output of the difference amplifier is always greater than 0V.

Figure 5:
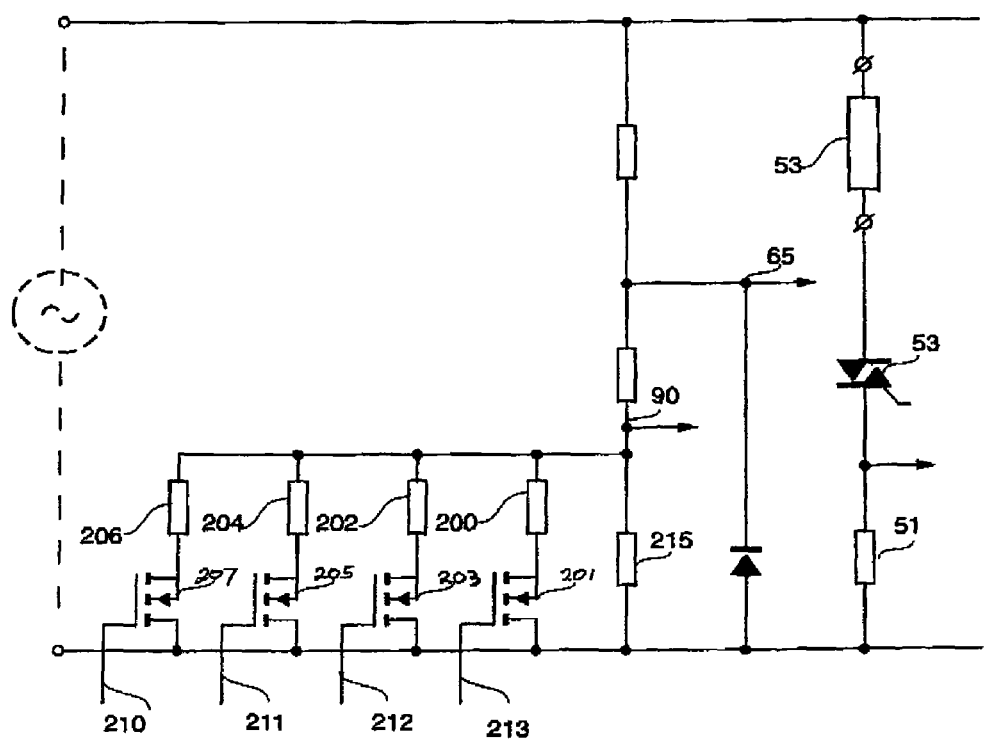
FIG. 5 is a circuit diagram of a bias control network used in conjunction with the embodiment of FIG. 3.

FIG. 5 shows a modification to the reference bridge section of the microcontroller circuit of FIG. 3 designed to achieve this.

Four parallel resistor/analogue switch combinations comprising respectively resistors 200, 202, 204, 206 and FET's operating as analogue switches 201, 203, 205, 207, are provided. Each FET can be individually turned ON (conducting) by independent logic control signals 210, 211, 212, 213. The control signals are provided by separate outputs from the microcontroller 64.

Any number of resistors and analogue-switches could be added in this way, at the risk of increased complexity in both hardware and software. The limitation is number of available microcontroller outputs that are required to drive each analogue switch. In practice the added component cost and circuit complexity needs to be weighed against the benefit of increased element compatibility. Cost will generally determine the optimum number of resistor/analogue-switch combinations used.

Current day FETs are available with very low internal resistance, in the order of milli-ohms. This resistance is negligible when compared with the resistor connected in series with each FET. So series resistors 200, 202, 204, 206 can be independently switched in or out of the circuit by the controlling the analogue switches, 201, 203, 205, 207.

The value of resistor 215 is chosen to match an element resistance value at the top end of the tolerance (ie. +5% for film elements, or +10% for iron cored PTC element). The values of the four parallel resistors, 200, 202, 204, 206 can be chosen such that their values are in the ratio of R, 2R, 4R and SR respectively, allowing a range of equivalent resistance values by using a binary coded sequence of signals to inputs 210-213. The values provide a resultant change in equivalent resistance from 90 to common to cover the fall manufacturing tolerance range of the heating element.

Note that although the circuit of FIG. 5 is supplied from a sinusoidal AC mains voltage, for analysis purposes only positive voltages need be considered, since negatively going voltages on the resistor divider are clamped in by diode 85.

The circuit shown is supplied by 230Vac mains, but the circuit configuration is equally valid for 110Vac mains supply.

The control signals Ka, Kb, Kc and Kd are provided by outputs from the microcontroller (IC5 of FIG. 3). The method of operation is as follows:

1. To begin with the element must be assumed to be "cold" ie. at room temperature. This may not always be valid, and care needs to be taken in assuming that the element is in fact "cold". A number of possible means exist to assume the element is "cold"— for example in a cooker, if it has not been used (no hotplate, griller or oven) for a period (for example) 8 hours then it can be assumed to be at room temperature at first switch ON. The cold calibration figure and time should be stored in EEPROM or other permanent memory so that the set-up conditions are not lost during a brief loss of mains power.

2. All analogue switches are in the OFF condition, (ie. maximum possible value of R3').

3. The element is powered for one mains half cycle only, while the microcontroller measures the resulting output voltage (Vt) from the difference amplifier.

4. From the value of the voltage Vt, the microcontroller can either use an algorithm or look-up-table to determine which resistors in the bias network must be used to provide the correct bias voltage to match the element cold resistance.

Note: In the circuit of FIG. 3 the OM1682 has been used to provide an easy means of control for a triac gate. However it is also possible to provide triac drive directly from a. microcontroller. For example such circuits are described in the Philips Application Note AN467 1 (December 2000), which references U.S. Pat. No. 5,734,289.

The invention claimed is:

1. A controller adapted to control the temperature of a heating element within a selected temperature range wherein the instantaneous electrical resistance of the element is measured to determine the instantaneous temperature of the element, comprising:
   a heating element of a type where the electrical resistance of the element increases with increasing element temperature;
   a switch adapted to electrically couple a sinusoidal alternating current power source to the heating element when a switch controller is in an ON state, and to decouple the sinusoidal alternating current power source from the heating element when the switch controller is in an OFF state;
   a current sensor coupled in series with the heating element and adapted to provide as an output a voltage, wherein the current sensor comprises a sense resistor, wherein said voltage is dependent on the magnitude of a electrical current passing through the heating element and said sense resistor;
   a zero set point controller adapted to supply a first voltage proportional to a supply voltage of the sinusoidal alternating mains current power source;
   a difference sensor with a first input connected to the current sensor, and
   a second input connected to the zero set point controller adapted to produce an output signal which is dependent on the difference between voltage signals received at the first and second inputs;
   an operational set point controller adapted to supply a second voltage proportional to the supply voltage of the sinusoidal alternating mains current power source, the value of the second voltage being dependent on a selected desired temperature of operation of the heating element;
   a timer adapted to supply timing pulses of a selected pulse duration and period;
   a threshold detector electrically connected to receive the output signal of the difference sensor and the output signal of the operational set point controller and adapted to provide a selected output when an extent of magnitude and direction of difference between the said signals is greater than a selected extent; and
   logic circuitry adapted to set the switch controller to an ON state in response to a said timing pulse, and to reset the switch controller to an OFF state in response to the selected output from the threshold detector.

2. The controller of claim 1 wherein the zero set point controller is further adapted to allow the value of said first voltage to be set by a user to be equivalent to an output voltage of the current sensor at a lowest temperature of the selected temperature range.

3. The controller of claim 1 wherein the operational set point controller is further adapted to be adjusted by a user to select a desired temperature of the heating element.

4. The controller of claim 1 wherein the difference sensor is a differential amplifier.

5. The controller of claim 1 wherein the switching means is a triac.

6. The controller of claim 1 wherein the switching means is a relay.

7. The controller of claim 1 wherein the threshold detector is adapted to function as an integrator.

8. The controller of claim 1 wherein the current sensor is a resistor.

9. The controller of claim 1 wherein the zero set point controller is a voltage divider.

10. The controller of claim 1 wherein the operational set point controller is a voltage divider, including at least one variable resistor.

11. The controller of claim 1 wherein the threshold detector is a comparator.

12. A controller adapted to control the temperature of a heating element within a selected temperature range wherein the instantaneous electrical resistance of the element is measured to determine the instantaneous temperature of the element, comprising:
   a heating element of a type where the electrical resistance of the element increases with increasing element temperature;
   a switch adapted to control the flow of an alternating current to the heating element when a switch controller is in an ON state, and to decouple the sinusoidal alternating current power source from the heating element when the switch controller is in an OFF state;
   a current sensor coupled in series with the heating element and adapted to provide as an output a voltage, wherein the current sensor comprises a sense resistor, wherein said voltage is dependent on the magnitude of an electric current passing through the heating element and said sense resistor;
   a zero set point controller adapted to supply a first voltage proportional to a supply voltage of the sinusoidal alternating current power source;
   a difference sensor with a first input connected to the current sensor, and
   a second input connected to the zero set point controller adapted to produce an output signal which is dependent on the difference between voltage signals received at the first and second inputs, an operational set point controller adapted to supply a second voltage proportional to the supply voltage of the sinusoidal alternating current power source, the value of the second voltage being dependent on a selected desired temperature of operation of the heating element;

further including a microcontroller including software to provide a timing function generating timing pulses having a predetermined pulse duration and period, said pulses causing the switch controller to turn the switch ON at predetermined intervals, the microcontroller being further adapted to receive the output signal of the difference sensor and the output signal of the operational set point controller and to provide a selected output when an extent of magnitude and direction of difference between the said signals is greater than a selected extent; and logic circuitry adapted to set the switch controller to an ON state in response to a said timing pulse, and to reset the switch controller to an OFF state in response to the selected output from the threshold detector.

13. The controller of claim 12 wherein the microcontroller and software are adapted to provide a self calibration function of the controller by periodically measuring and recording the magnitude of the output of the difference sensor at times when the element is at room temperature.

14. The controller of claim 13 wherein the microcontroller is adapted to calibrate the room temperature value of the heating element resistance by using internal timing or stored timing means to ensure that the element has been turned OFF for an extended or known period of time.

15. The controller of claim 13 wherein the microcontroller is adapted to calibrate the room temperature value of the heating element resistance by turning the heating element ON for one half or one full mains cycle only, such that the voltage across the sensing means can be quickly measured before the element has increased in temperature above its room temperature value.

16. The controller of claim 12 wherein the microcontroller timing function is adapted to vary the period of the timing pulse, such that at low control temperatures, the period is increased, such that the duty cycle is decreased without decreasing the minimum ON time.

17. The controller of claim 12 wherein the microcontroller is adapted to continuously monitor ON state temperature, and integrate the temperature over the operating time of the element, and include the appropriate correction to resultant output of the difference sensor in order to maintain the element temperature at the desired set-point, and compensate for any drift in the resistance versus temperature characteristic of the heating element.

18. The controller of claim 12 wherein the switching device is a triac.

19. The controller of claim 12 wherein the switching device is a relay.

* * * * *

UNITED STATES PATENT AND TRADEMARK OFFICE
CERTIFICATE OF CORRECTION

| | | |
|---|---|---|
| PATENT NO. | : 7,256,371 B2 | Page 1 of 1 |
| APPLICATION NO. | : 11/083448 | |
| DATED | : August 14, 2007 | |
| INVENTOR(S) | : Crawford et al. | |

It is certified that error appears in the above-identified patent and that said Letters Patent is hereby corrected as shown below:

Title Page
In the Title (54):

Replace "Temperature Control Method for Positive Temperature Coefficient Type Heating Element" with --Heating Element Control--.

Signed and Sealed this

Twentieth Day of November, 2007

JON W. DUDAS
*Director of the United States Patent and Trademark Office*